Nov. 13, 1934.  M. MANNING  1,980,942
METHOD AND APPARATUS FOR CEMENTING WELLS
Filed Oct. 12, 1931
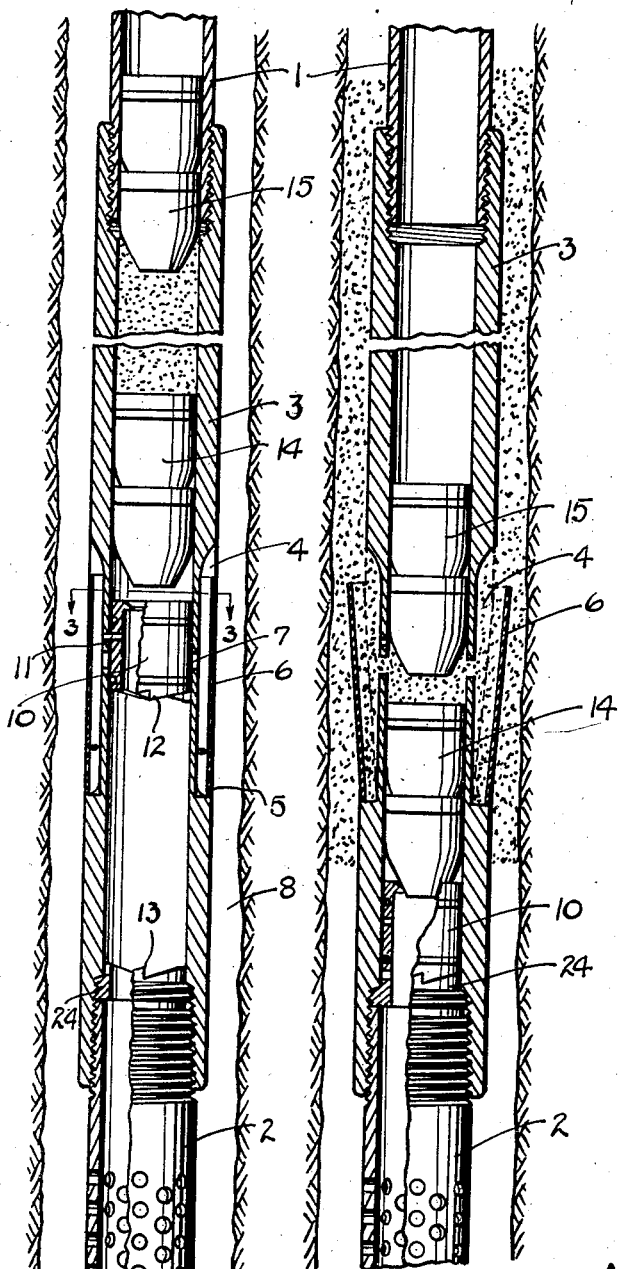
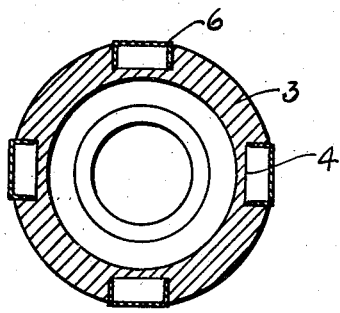
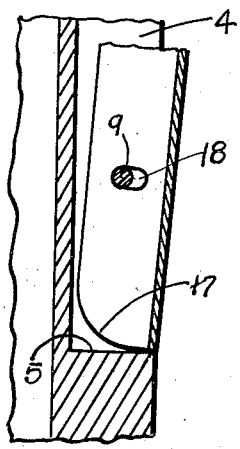
Margia Manning, Inventor
By Jesse R. Stone & Lester B. Clark
Attorney Patented Nov. 13, 1934

1,980,942

UNITED STATES PATENT OFFICE 1,980,942

METHOD AND APPARATUS FOR CEMENTING WELLS

Margia Manning, Houston, Tex., assignor to The R. S. M. Company, Inc., Houston, Tex.

Application October 12, 1931, Serial No. 568,473

3 Claims. (Cl. 166—21)

My invention relates to the cementing of casing in deep wells in the production of oil, gas, sulphur and the like.

In the common method of cementing the casing in the well preparatory for bringing in the well the strainer is not introduced into the hole until the casing has been properly cemented. The well is drilled down to the producing formation, the casing is then set in position and the cement is discharged down around the lower end of the casing, and up around the same in the well to effectively close off the entrance to the bottom of the well of fluid from above. When the cement has been allowed to set a well drill is introduced through the casing to drill out the cement in the lower end thereof, and to extend the well downwardly into the producing formation. The strainer is then set at the end of the section of liner projecting downwardly through the lower end of the casing into the well extension.

It is an object of my invention to provide a means of cementing the casing in the well with the strainer at the lower end thereof and without the necessity of first cementing the casing before the strainer is set.

I contemplate drilling into the producing stratum with a hole of uniform diameter with that in which the casing is set and fixing the strainer at the lower end of the casing, introducing the assembled casing and strainer into the hole, and cementing the casing above the strainer without interfering in any way with the strainer itself.

I have found that when the lower end of the hole is filled with liquid such as drilling fluid, cement may be discharged from the lower end of the casing into the hole above the strainer and that the cement will flow upwardly without mingling with the mud about the strainer. The cement will thus form a seal about the lower end of the casing in the usual manner but without the necessity of setting the strainer separately thereafter.

The invention also includes the particular arrangement by means of which the cement may be discharged into the hole.

In the drawing herewith, Fig. 1 is a central longitudinal section through a casing equipped to carry out my invention and with the deflector or valve members closed.

Fig. 2 is a similar view with the parts in cementing position.

Fig. 3 is a transverse section somewhat enlarged taken on the plane 3—3 of Fig. 1.

Fig. 4 is an enlarged broken detail taken in section through the valve employed in a discharge opening.

In the drawing I have shown the casing 1 as connected to the strainer 2 by means of a special barrel or nipple 3. The barrel is shown as made of somewhat thicker pipe than is the casing or strainer and the wall is formed at a plurality of points with lateral grooves or longitudinal recesses 4 therein, the upper ends of which are curved outwardly and the lower ends are squared to form shoulders 5 upon which the deflector or valve members 6 may contact. An opening shown at 7 extends from the inner wall of the barrel into the recess 4 to accommodate the discharge of cement through the wall of the barrel into the space 8 between the casing and the wall of the well into which the cement is to be discharged.

The valve 6 is shaped to fit within the recess 4 as will be most clearly seen from Fig. 3. The valve or deflector is U-shaped in cross section and the lower end as shown at 17 in Fig. 4 is rounded to allow the deflector to swing outwardly at its upper end when the cement is to be discharged. Lateral openings 18 on each of the side walls of the valve member are adapted to receive a transverse pin 9 extending through the walls of the recess and through the deflector and acting to form a pivot allowing a limited amount of outward swing of the upper end of the same. Said valve or deflector does not entirely close the discharge opening at the upper end, so that a limited discharge passage is provided even when the valve is closed.

I contemplate normally closing the outlet opening 7 from the barrel to the recess by means of a plug or valve member 10. This valve member has a passage longitudinally thereof, and is held in position by a pin 11 made of some frangible material which may be broken or sheared off by pressure from above. This type of valve is old in the art. The lower end of the same is formed with teeth 12 which, when the valve is moved downwardly, may engage with teeth 13 upon a ring 14 and fixed in the barrel at the upper end of the strainer.

In cementing it is common to discharge the cement downwardly in the casing between a forward plug 14 and an upper plug 15. The plug 14 is placed in the casing and the cement is forced in above the plug and when the full charge is in the casing the upper plug is placed in position and the whole charge is forced downwardly to the lower end of the well by pump pressure. When the lower plug engages the valve member 10, the force of the pump will shear off the pin 11, moving the valve downwardly with the plug 14 to engage with the stop ring 13, as shown in Fig. 4. When in this position the movement of the upper plug 14 downwardly will discharge the cement through the openings 7 forcing the valve members outwardly into the position shown in Fig. 2 and allowing a free discharge of the cement in an upward direction around the lower end of the casing.

As previously noted, the lower end of the hole is normally filled with a thick mud. As no circulation of this mud occurs, due to the fact that the lower end of the well is closed, the cement will not move downwardly but will take a course upwardly around the lower end of the casing and will not move down and mix with the mud about the strainer. When the cement has been discharged around the casing in the hole it is allowed to set until the casing is firmly fixed in position. A drill is then used to cut away the plugs 14 and 15 which are normally made of wood or other easily disintegrated material. The valve member 10 may also be broken up if desired by the rotation of the drill and the engagement of the teeth 12 on the valve with the teeth 13 on the ring and prevent rotation of the valve while it is being broken up. The drill may then be withdrawn and the well may be cleaned by the use of clear water or other cleansing fluid removing the mud from about the screen and allowing the well to come in.

The advantage of my construction lies in the fact that the cementing of the hole may be done with the strainer attached thereto in an open hole of uniform diameter. No packer or other means to prevent the cement from flowing down about the strainer will be necessary on account of the presence of mud in the space 8 about the casing. The process of cementing the well will thus be made cheaper and a shorter length of time will be consumed in the cementing and setting of the strainer. Accidents due to this operation will also be lessened. The further advantages will be obvious.

Having described my invention, what I claim as new is:

1. A well casing, a strainer thereon, a discharge opening in said casing above said strainer, said casing having a longitudinal recess into which said opening connects, a deflecting member fitting in said recess and pivoted to swing outwardly at its upper end to direct the cement from said opening upwardly, said deflecting member being trough-shaped, means to limit the swinging of said deflecting member, and means to force the cement through said opening.

2. A method of cementing an assembled casing and strainer in an open hole well bore filled with fluid mud comprising, the steps of lowering the combination casing and strainer into the open hole, discharging cement from the casing and deflecting the cement upwardly as it is discharged into the fluid mud outside of the casing so that the fluid mud serves as a support for the cement until the cement has set.

3. A method of cementing an assembled casing and strainer in an open hole well bore filled with fluid mud comprising, the steps of lowering the combination casing and strainer into the open hole, leaving the hole unobstructed above the strainer, trapping the fluid mud in the well below the point to be cemented inside the casing, discharging cement from the casing, deflecting the cement upwardly as it is discharged into the fluid mud outside the casing to trap the fluid mud outside the casing by the discharging of the cement so that the cement will solidify at an elevation above the mud covered strainer.

MARGIA MANNING.